US010501033B2

(12) United States Patent
Khoo et al.

(10) Patent No.: US 10,501,033 B2
(45) Date of Patent: Dec. 10, 2019

(54) VEHICLE SHARING SYSTEMS AND METHODS

(71) Applicant: TOYOTA MOTOR ENGINEERING & MANUFACTURING NORTH AMERICA, INC., Erlanger, KY (US)

(72) Inventors: Wilson-Boon Siang Khoo, Allen, TX (US); Ming Michael Meng, Novi, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 357 days.

(21) Appl. No.: 15/484,678

(22) Filed: Apr. 11, 2017

(65) Prior Publication Data

US 2018/0290609 A1 Oct. 11, 2018

(51) Int. Cl.
*B60R 16/037* (2006.01)
*F02D 41/22* (2006.01)
*G07C 5/00* (2006.01)
*G07C 5/08* (2006.01)

(52) U.S. Cl.
CPC ............ *B60R 16/037* (2013.01); *G07C 5/008* (2013.01); *G07C 5/0825* (2013.01); *G07C 5/0841* (2013.01); *Y02T 10/40* (2013.01)

(58) Field of Classification Search
None
See application file for complete search history.

(56) References Cited

U.S. PATENT DOCUMENTS

| | | | |
|---|---|---|---|
| 6,988,034 B1 * | 1/2006 | Marlatt | G06Q 10/02 701/468 |
| 7,761,232 B2 | 7/2010 | Woodings | |
| 8,594,861 B2 | 11/2013 | Rovik et al. | |
| 8,630,764 B2 | 1/2014 | Dabholkar | |
| 9,020,697 B2 | 4/2015 | Ricci et al. | |
| 9,106,803 B2 | 8/2015 | Cazanas et al. | |
| 9,251,631 B2 | 2/2016 | Thompson et al. | |
| 9,288,270 B1 | 3/2016 | Penilla et al. | |
| 2009/0254241 A1 | 10/2009 | Basir | |
| 2010/0233957 A1 | 9/2010 | Dobosz | |
| 2011/0251751 A1 | 10/2011 | Knight | |
| 2012/0303178 A1 | 11/2012 | Hendry et al. | |

(Continued)

*Primary Examiner* — Todd M Melton
*Assistant Examiner* — Jason R Roberson
(74) *Attorney, Agent, or Firm* — Oblon, McClelland, Maier & Neustadt, L.L.P.

(57) ABSTRACT

A vehicular data correlation system includes a first network access device (NAD) of a first vehicle; and a database server having processing circuitry. The processing circuitry is configured to cross-reference a first driver settings dataset in a driver settings database to a first vehicle dataset in a vehicle database to form a first enhanced data packet, cross-reference a first vehicle conditions dataset in a vehicle conditions database to a first driver dataset in a driver database to form a second enhanced data packet, correlate the first enhanced data packet with the second enhanced data packet, download the first enhanced data packet to the first NAD, download the second enhanced data packet to the first NAD, and transmit a first initiation signal to implement the first driver settings dataset and to display the first vehicle conditions dataset on the first vehicle, via the first NAD.

11 Claims, 10 Drawing Sheets

(56) References Cited

U.S. PATENT DOCUMENTS

| | | |
|---|---|---|
| 2012/0323763 A1 | 12/2012 | Michael |
| 2013/0204455 A1* | 8/2013 | Chia .................. G07C 5/008 701/1 |
| 2013/0304276 A1* | 11/2013 | Flies .................. G06F 17/00 701/1 |
| 2015/0217780 A1 | 8/2015 | Chen et al. |
| 2016/0104486 A1 | 4/2016 | Penilla et al. |
| 2016/0167608 A1 | 6/2016 | Rai |
| 2016/0239893 A1 | 8/2016 | Kosseifi et al. |

* cited by examiner

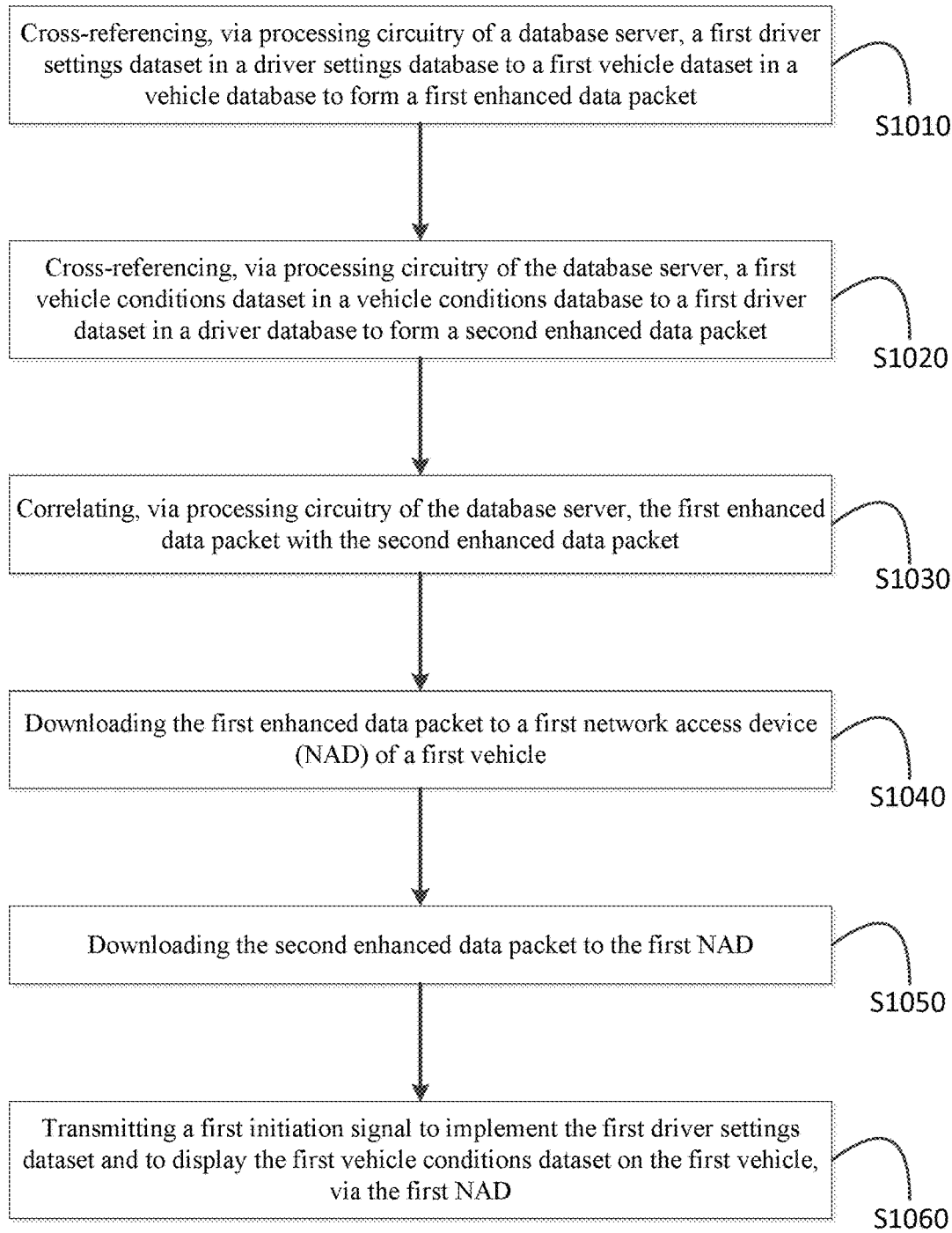

VEHICLE SHARING SYSTEMS AND METHODS

BACKGROUND

It is common for a household to use more than one vehicle. As a result, each household member may drive more than just one vehicle. However, each time a vehicle is driven by someone other than a previous driver, the settings are for the previous driver. Therefore, resetting things, such as infotainment, seats, mirrors, navigation destinations, etc. is required for all subsequent drivers different from the last driver.

In addition, each driver may not be familiar with vehicle conditions of each vehicle. Therefore, a second driver may not know of certain mechanical issues that arose with a first driver for a particular vehicle.

The "background" description provided herein is for the purpose of generally presenting the context of the disclosure. Work of the presently named inventors, to the extent it is described in this background section, as well as aspects of the description which may not otherwise qualify as conventional at the time of filing, are neither expressly nor impliedly admitted as conventional against the present disclosure.

SUMMARY

One embodiment includes a vehicular data correlation system including a first network access device (NAD) of a first vehicle; and a database server having processing circuitry. The processing circuitry is configured to cross-reference a first driver settings dataset in a driver settings database to a first vehicle dataset in a vehicle database to form a first enhanced data packet, cross-reference a first vehicle conditions dataset in a vehicle conditions database to a first driver dataset in a driver database to form a second enhanced data packet, correlate the first enhanced data packet with the second enhanced data packet, download the first enhanced data packet to the first NAD, download the second enhanced data packet to the first NAD, and transmit a first initiation signal to implement the first driver settings dataset and to display the first vehicle conditions dataset on the first vehicle, via the first NAD.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a flowchart for an exemplary vehicular data processing method according to one embodiment.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

In the interest of clarity, not all of the features of the implementations described herein are shown and described in detail. It will be appreciated that in the development of any such actual implementation, numerous implementation-specific decisions need to be made in order to achieve the developer's specific goals, such as compliance with application- and business-related constraints, and that these specific goals will vary from one implementation to another and from one developer to another.

Figure 1:
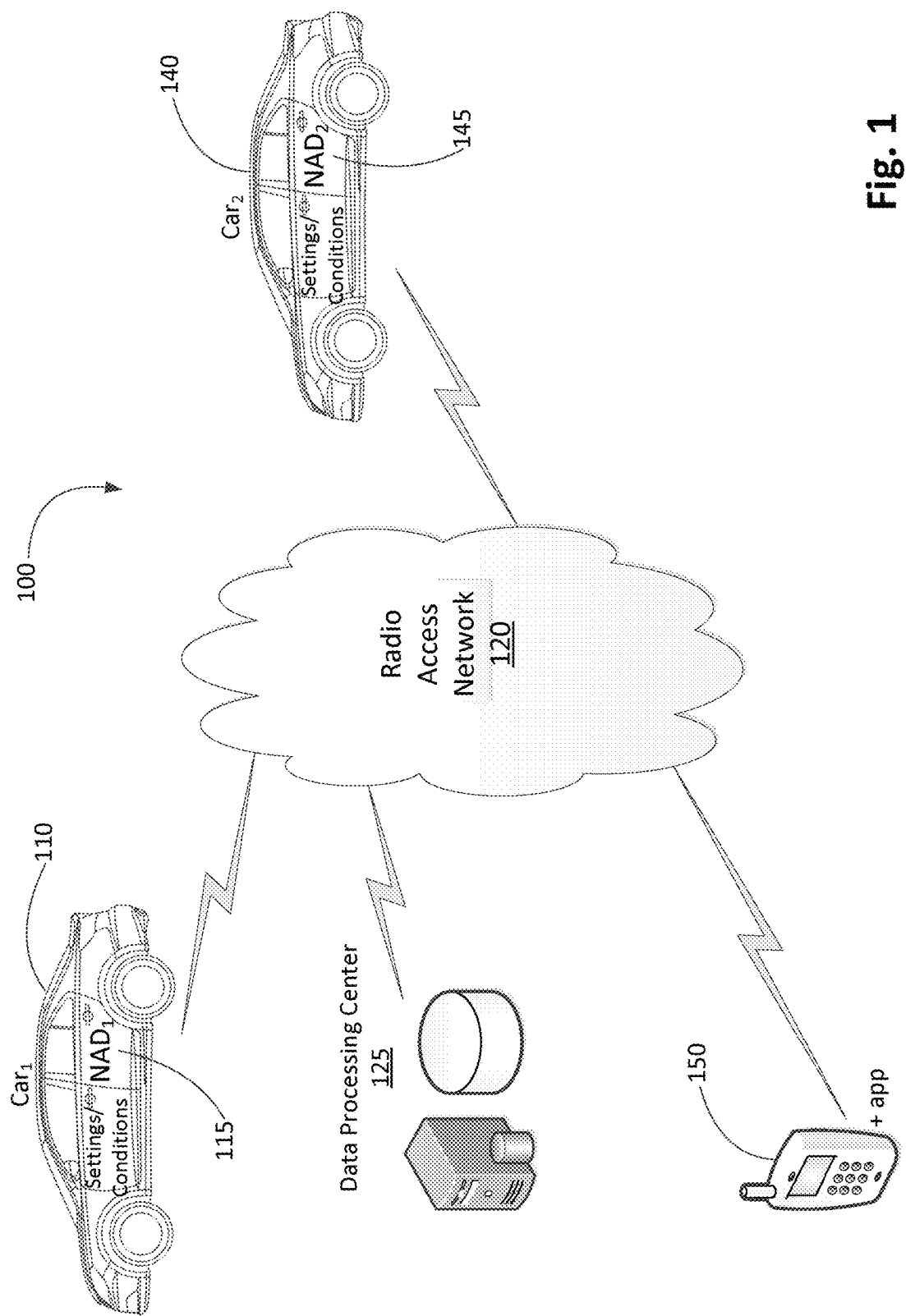
FIG. 1 illustrates an exemplary communications network according to one embodiment.

Embodiments herein describe systems and methods for sharing vehicles. FIG. 1 illustrates an exemplary communications network 100 for transferring settings and conditions from one vehicle to another vehicle. When a driver A of a first vehicle 110 (Car$_1$) turns off the ignition of the first vehicle 110, all settings at the time of turning off the ignition are saved and sent to a first Network Access Device (NAD$_1$) 115. Table 1 illustrates an exemplary saved settings history for a personal vehicle, such as first vehicle 110.

TABLE 1

| | Saved Settings for Car$_1$ | | | | |
| --- | --- | --- | --- | --- | --- |
| Driver Info | Audio Source | Navigation | Date/Time | Radio | Quick Dial |
| Smart key ID | Internet | Airport | 2/17 13:00 | 103.5 | 5553216 |

The first NAD 115 communicates the saved settings of Table 1 through a Radio Access Network (RAN) 120 to a data processing center 125. The data contained in Table 1 is saved in a database of the data processing center 125, which identifies the driver A, the first vehicle 110, and the last history of the first vehicle 110. One or more databases of the data processing center 125 hold information of driver A and all vehicles registered to driver A.

When driver A wishes to use a second vehicle 140 (Car$_2$), driver A can use a mobile application downloaded on a mobile phone 150 to make a request that his/her saved settings be sent to the second vehicle 140. The mobile phone 150 sends the request to the RAN 120, wherein the RAN 120 routes the request to the data processing center 125.

The data processing center 125 locates the user profile for driver A and sends the saved settings of driver A to a second NAD (NAD$_2$) 145 of the second vehicle 140. The second NAD 145 receives and saves the Table 1 settings of driver A.

When driver A starts the ignition of the second vehicle 140, the second NAD 145 sends the saved settings to associated systems of the second vehicle 140, such as the infotainment center and the navigation destination. As a result, systems for all of driver A's saved settings are automatically initiated in the second vehicle 140 upon starting the engine.

Figure 2:
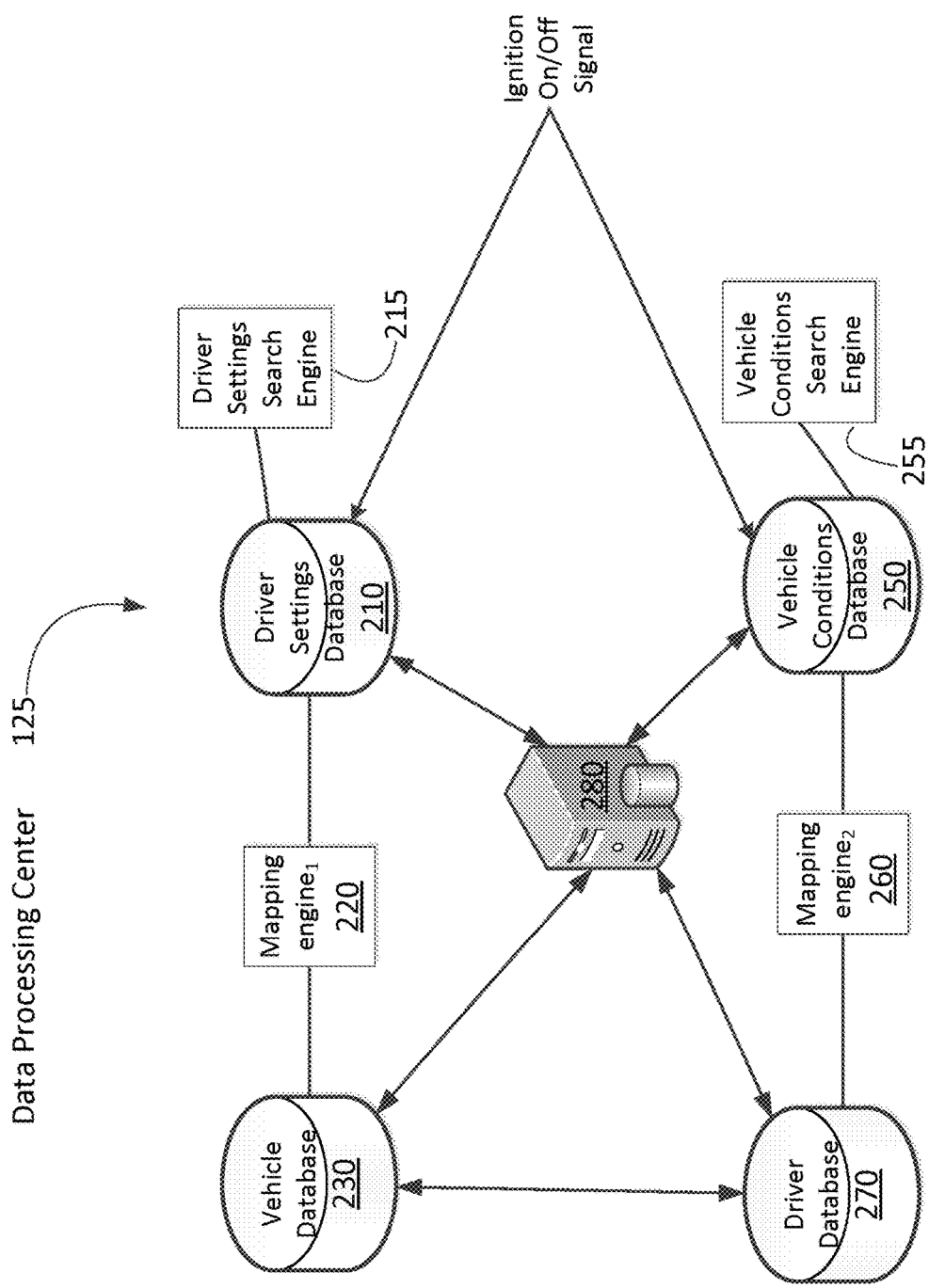
FIG. 2 is an illustration of a data processing center according to one embodiment.

FIG. 2 is an illustration of the data processing center 125 in more detail. When the ignition of a vehicle, such as the first vehicle 110 or the second vehicle 140 is turned on or off, the settings of the vehicle are saved to the associated first NAD 115 or second NAD 145. The saved settings, such as the data of Table 1 are forwarded to the RAN 120, and the RAN 120 forwards the data to the data processing center 125. When the data processing center 125 receives the data, the data is input into a driver settings database 210.

When a request has been received to retrieve the settings for a particular driver, such as the settings for driver A and send the driver settings to a different vehicle, such as the second vehicle 140, the driver settings database 210 is searched, via a driver settings search engine 215 for the saved settings of driver A.

All of the vehicle data for which driver A is registered, such as vehicle data for the first vehicle 110 and the second vehicle 140 are located in a vehicle database 230 of the data processing center 125. When the saved settings of driver A are located by the driver settings search engine 215, a first mapping engine 220 maps the saved settings of driver A to the registration data for the second vehicle 140 according to the request. Therefore, the first mapping engine 220 maps the saved settings of driver A from the driver settings database 210 to the registration data of the second vehicle 140 located in the vehicle database 230.

FIG. 2 also illustrates a second set of databases. When the ignition of a vehicle is turned on or off, conditions of the particular vehicle are input into a vehicle conditions database 250 of the data processing center 125. Table 2 illustrates an exemplary table of conditions for a vehicle, such as the first vehicle 110.

TABLE 2

Saved Conditions for Car$_1$

| Date/Time | Longitude | Latitude | Trigger | Mileage |
|---|---|---|---|---|
| | | | Fuel level | |
| | | | Check engine light | |
| | | | Maintenance reminder | |

Table 2 illustrates some exemplary trigger conditions, such as fuel level, check engine light (or other onboard detector error code), or a maintenance reminder such as a change oil reminder. A vehicle conditions search engine 255 searches for previous condition data for the first vehicle 110 in the vehicle conditions database 250. If there is a previous record status for a particular recorded trigger such as the fuel level, the previous record status is replaced with the current status. For example, if the previous record for the fuel level was low and the current status for the fuel level is full, the previous low fuel level is replaced with the current full fuel level.

If no condition data for a particular trigger for the first vehicle 110 is found, a new record is created for the first vehicle 110 in the vehicle conditions database 250. For example, there may not be an existing record for an oil change reminder for the first vehicle 110. Therefore, the oil change reminder will be input in the vehicle conditions database 250 for the first vehicle 110. At a subsequent time when the oil has been changed for the first vehicle 110, the vehicle conditions database 250 will be updated with a changed oil status upon turning on or turning off the ignition.

Registered driver data for each driver of a vehicle is stored in a driver database 270. When condition data from Table 2 is input into the vehicle conditions database 250 for the first vehicle 110, a second mapping engine 260 maps the condition data from Table 2 to each registered driver for the first vehicle 110, such as driver A, driver B, and driver C. Therefore, the conditions data from Table 2 inputted into the vehicle conditions database 250 is mapped, via the second mapping engine 260 to each registration data record for driver A, driver B, and driver C located in the driver database 270.

FIG. 2 illustrates the effective and efficient correlation of data via a database server 280. Database server 280 controls the correlation of driver settings data in the driver settings database 210 with respective vehicle data in the vehicle database 230. Likewise, the database server 280 controls the correlation of vehicle conditions data in the vehicle conditions database 250 with respective driver data in the driver database 270. The database server 280 also correlates data between the vehicle database 230 and the driver database 270.

The transfer of vehicle conditions data can be illustrated with reference to FIG. 1. When the ignition of the first vehicle 110 is turned off by driver A, the current conditions of the first vehicle 110 are saved to the first NAD 115, such as the conditions of the first vehicle 110 illustrated in Table 2. The first NAD 115 transfers data for the current conditions of the first vehicle 110 to the RAN 120. The RAN 120 forwards the data to the data processing center 125.

When a different driver, such as driver B requests current conditions data for the first vehicle 110, via the mobile phone 150 and associated mobile application, the request is sent to the RAN 120, which forwards the request to the data processing center 125. When the request has been received by the data processing center 125 to retrieve the conditions for the first vehicle 110, the conditions for the first vehicle 110 are retrieved from the data processing center 125. The retrieved results of the conditions for the first vehicle 110 are sent to the RAN 120 and displayed to driver B on the mobile phone 150, which would provide advance notice to driver B of any actions that should be taken in response to the results. The results can also be forwarded to the first vehicle, via the first NAD 115 and displayed to driver B on a display screen of the first vehicle 110. A similar transfer of conditions data can also be made for the second vehicle 140 to any registered drivers of the second vehicle 140.

FIG. 2 illustrates that turning the ignition on or off for a particular vehicle automatically saves the settings and the conditions for that vehicle into the driver settings database 210 and the vehicle conditions database 250, respectively. FIG. 2 also illustrates that the vehicle database 230 and the driver database 270 are correlated.

The vehicle conditions database 250 has been illustrated as including maintenance data, such as the data in Table 2.

However, the vehicle conditions database 250 can also include broader-encompassing data that is either automatically inputted by the manufacturer or manually inputted by one or more drivers of the vehicle. For example, a driving schedule can be used in which a registered driver holds a particular day and timeslot for usage of a particular vehicle. Scheduled servicing or detailing can also be inputted into the driving schedule.

A manufacturing maintenance schedule can be inputted by the manufacturer for suggested service or replacement of parts. In addition, comments from one or more drivers can be manually inputted, such as any abnormal vehicle performance (e.g. the vehicle is driving sluggish, the brakes are making a squeaky noise, the fan is making a loud vibration noise, the passenger power window stopped working, etc.).

In one embodiment, the various clusters of vehicle conditions can be combined into a single vehicle conditions database 250. In another embodiment, multiple databases can be employed. For example, a separate database can be employed for a vehicle mechanical systems status (e.g. Table 2), a manufacturer's suggested maintenance schedule, a driver's schedule, scheduled servicing and/or detailing, and drivers' notes (e.g. abnormal performance notes).

Figure 3:
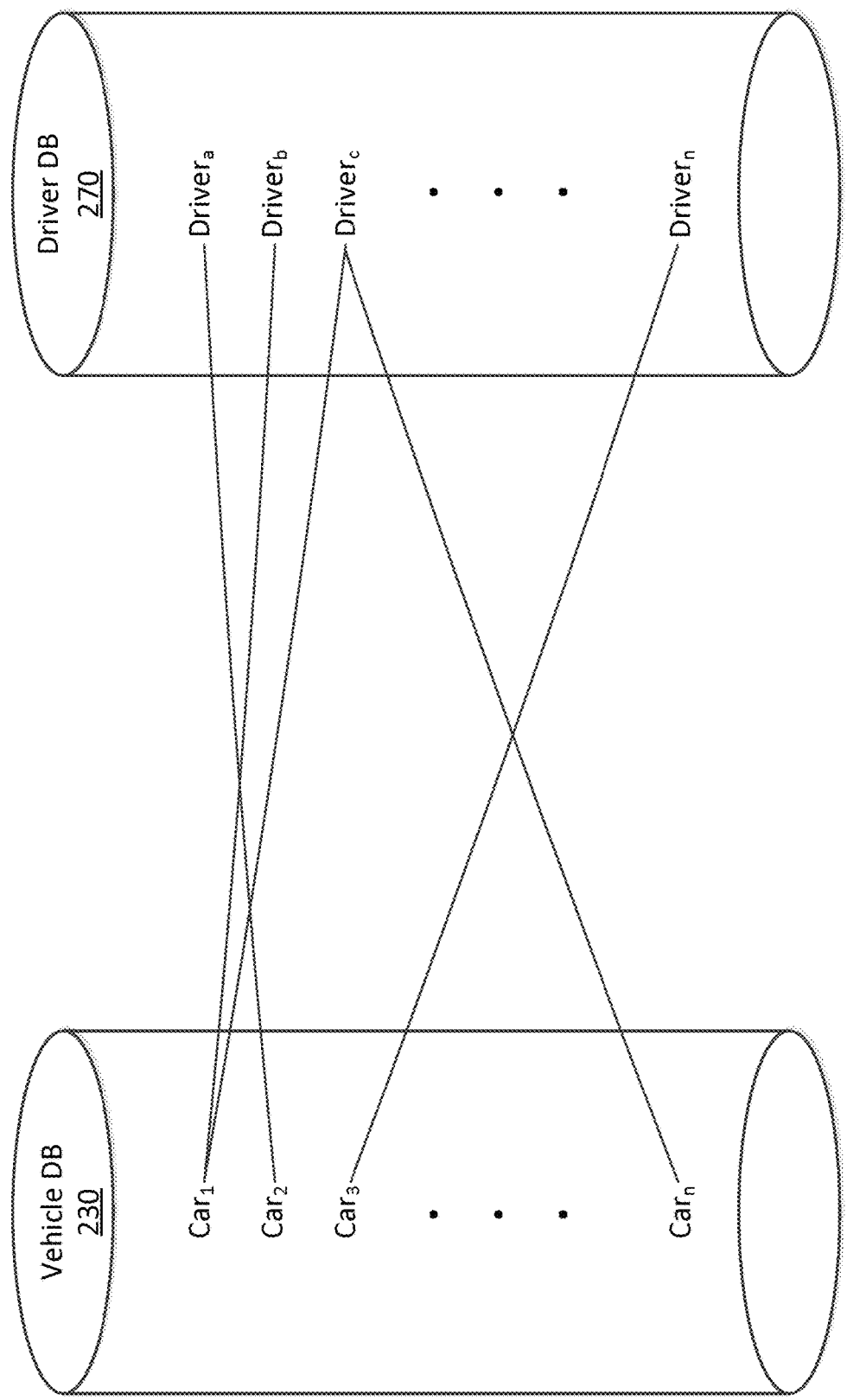
FIG. 3 illustrates an exemplary correlation of a vehicle database and a driver database according to one embodiment.

FIG. 3 illustrates an exemplary correlation of the vehicle database 230 and the driver database 270. In FIG. 3, $car_1$ is correlated with $driver_b$ and $driver_c$. $Car_2$ is correlated with $driver_a$. $Car_3$ is correlated with $driver_n$. $Car_n$ is correlated with $driver_c$. FIG. 3 also illustrates $driver_a$ is correlated with $car_2$. $Driver_b$ is correlated with $car_1$. $Driver_c$ is correlated with $car_1$ and $car_n$. $Driver_n$ is correlated with $car_3$.

FIG. 3 illustrates only four vehicles in the vehicle database 230 and only four drivers in the driver database 270 for ease of illustration. However, embodiments described herein can apply to thousands of vehicles in the vehicle database 230 and/or thousands of drivers in the driver database 270. The vehicle database 230 and the driver database 270 are not intended to only represent a sample household of vehicles and drivers.

The vehicle database 230 can also include vehicle messaging to all registered drivers. For example, when a particular car will be temporarily out of service, such as an unexpected repair or an accident, the respective information can be relayed to all registered drivers. Therefore, if a second driver is expecting to use a particular vehicle later in the day, a forwarded message about the unexpected repair or accident can be forwarded to the second driver. The forwarded message can be sent to one or more mobile devices of the registered drivers. This allows the second driver to make alternative plans in advance.

In a similar manner, the driver database 270 can also include driver information that is forwarded to all registered vehicles of the particular driver. For example, the driver may have planned to use a first vehicle to make errands. However, the first vehicle is not available. The driver can forward a message to all registered vehicles to inquire about the next availability of one of the vehicles to complete the errands. The forwarded message can be displayed on the display screen of the respective vehicles, as well as the registered mobile devices of the respective drivers.

FIGS. 2 and 3 illustrate some of the technical advantages provided by embodiments described herein. A first advantage is provided by uploading the settings, as well as the conditions of a vehicle upon turning the vehicle ignition on or off. A second advantage is provided by the correlation of the vehicle database 230 and the driver database 270. The conditions and settings of any particular vehicle are correlated with all drivers registered to operate that vehicle. Therefore, any registered driver has the latest data of settings and conditions for that vehicle upon turning on the ignition. In addition, each driver is correlated with all vehicles in which a particular driver is registered. Therefore, all settings for a particular driver are automatically downloaded to any registered vehicle the particular driver has selected upon turning on the ignition.

Embodiments described herein provide technical advantages in part by the correlation of data tables within the multiple databases. Each condition for a particular vehicle in the one or more vehicle conditions databases 250 is cross-referenced by the second mapping engine 260 to all registered drivers for that vehicle in the driver database 270. For example, a first vehicle conditions table in the vehicle conditions database 250 includes all conditions for a first vehicle, a second vehicle conditions table includes all conditions for a second vehicle, etc. The first vehicle conditions table is cross-referenced to all registered drivers of the first vehicle in the driver database 270. The second vehicle conditions table is cross-referenced to all registered drivers of the second vehicle in the driver database 270, etc.

In one embodiment, an enhanced data packet can be utilized to condense data, such as the first vehicle conditions table cross-referenced to all registered drivers of the first vehicle in the driver database 270. By condensing the cross-referenced data into a single data structure, vast amounts of data are condensed, which reduces computer network congestion. Likewise, an enhanced data packet can condense the data for the second vehicle conditions table cross-referenced to all registered drivers of the second vehicle in the driver database 270.

In a similar manner, each setting for a particular driver in the driver settings database 210 is cross-referenced by the first mapping engine 220 to all vehicles in which that driver is registered to drive in the vehicle database 230. For example, a first driver settings table in the driver settings database 210 includes all settings for a first driver, a second driver settings table includes all settings for a second driver, etc. The first driver settings table is cross-referenced to all vehicles the first driver is registered to drive in the vehicle database 230. The second driver settings table is cross-referenced to all vehicles the second driver is registered to drive in the vehicle database 230, etc.

In one embodiment, an enhanced data packet can also be utilized to condense data for the first driver settings table cross-referenced to all vehicles the first driver is registered to drive in the vehicle database 230. Likewise, an enhanced data packet can condense the data for the second driver settings table cross-referenced to all vehicles the second driver is registered to drive in the vehicle database 230.

The vehicle database 230 includes vehicle data cross-referenced with associated driver settings data from the driver settings database 210 to form associated "vehicle data/driver settings" enhanced data packets. The driver database 270 includes driver data cross-referenced with associated vehicle conditions data from the vehicle conditions database 250 to form associated "driver data/vehicle conditions" enhanced data packets. Likewise, data for each vehicle in the vehicle database 230 is cross-referenced with data for all drivers registered to drive each respective vehicle in the driver database 270. Therefore, "vehicle data/driver settings" enhanced data packets from the vehicle database 230 can be correlated with "driver data/vehicle conditions" enhanced data packets from the driver database 270.

For example, if a first driver from the driver database 270 has selected a first vehicle to drive from the vehicle database 230, the first driver settings from the driver settings database 210 are downloaded to the first vehicle when the ignition is turned on. In addition, the first driver has received all vehicle conditions pertaining to the first vehicle from the vehicle conditions database 250, which are downloaded to the first vehicle when the ignition is turned on. The downloaded conditions can be displayed to the first driver on a display screen of the first vehicle. The downloaded conditions can also be sent to a mobile device registered with the first driver.

The improved efficiency of the driver settings database 210, the driver settings search engine 215, the first mapping engine 220, the vehicle database 230, the vehicle conditions database 250, the vehicle conditions search engine 255, the second mapping engine 260, and the driver database 270 and associated processing circuitry of the data processing center 125 provide instant vehicle settings and instant delivery of vehicle conditions upon starting the vehicle ignition. Updated settings and conditions are automatically uploaded to the data processing center 125 upon turning the vehicle ignition off.

Figure 4:
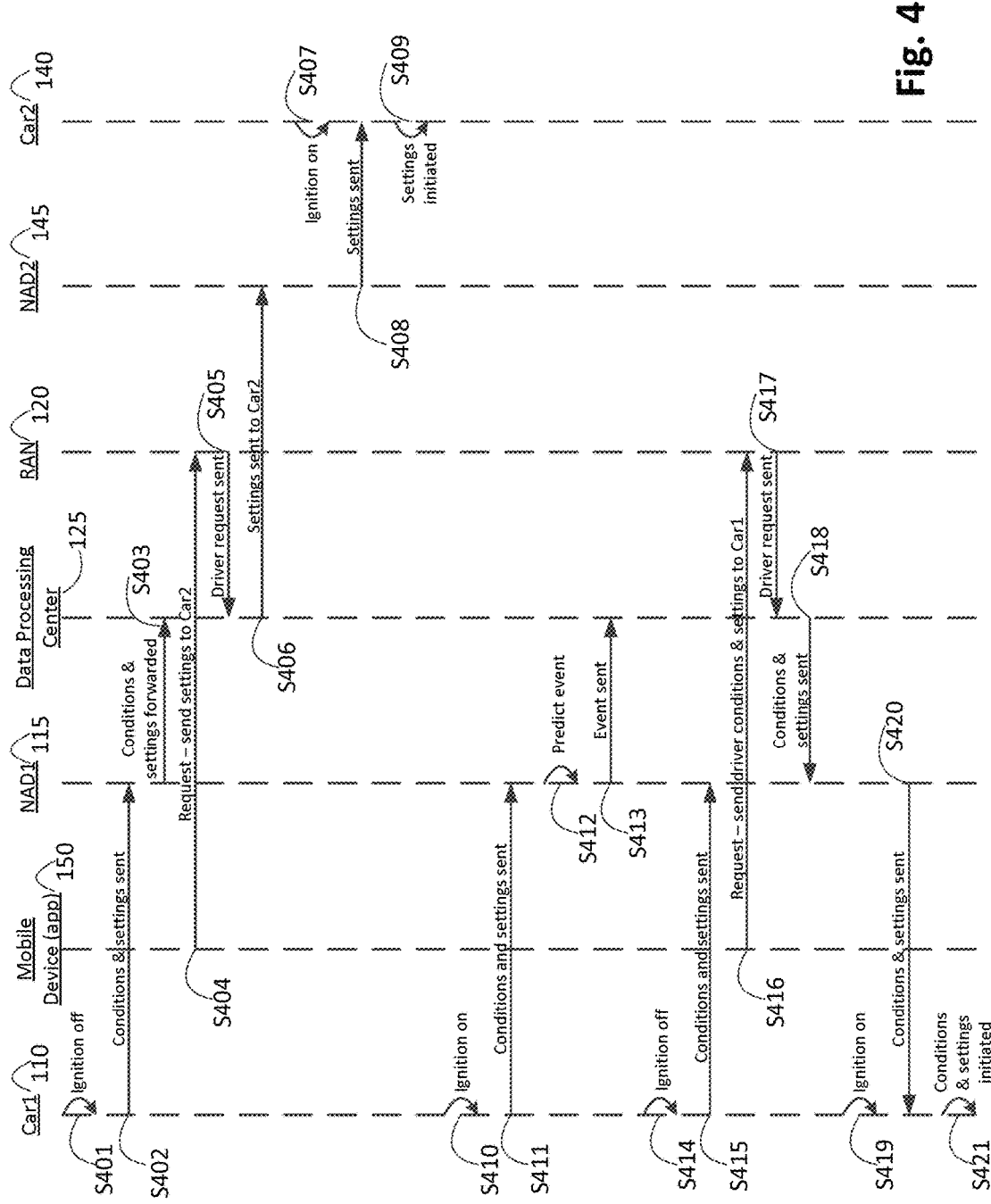
FIG. 4 is a flowchart which illustrates saving, transferring, and determining vehicular information according to one embodiment.

FIG. 4 is a flowchart which illustrates saving, transferring, and determining vehicular information, including vehicular information between multiple vehicles. In step S401, the ignition of $Car_1$ 110 is turned off. When the ignition is turned off, several settings and conditions of $Car_1$ 110 are automatically saved. The saved settings include, but are not limited to all infotainment settings, memory seat settings, memory mirror settings, and any saved navigation destinations. Saved conditions include, but are not limited to fuel level, any maintenance reminders, any fluids that might need to be added or changed, upcoming inspections that are due, car washings needed, tire pressure that needs to be adjusted, and any systems that appear to not be working properly. Saved conditions also include, but are not limited to a driver schedule with driver reservations, scheduled maintenance or detailing, and items of interest or in need of further attention.

In step S402, the saved conditions and settings are sent to the $NAD_1$ 115 of $Car_1$ 110. The $NAD_1$ 115 forwards the conditions and settings of $Car_1$ 110 to the data processing center 125 in step S403.

In step S404, mobile device 150 sends a request to the RAN 120. The request includes sending driver settings to another vehicle, $Car_2$ 140. In step S405, the driver request is sent from the RAN 120 to the data processing center 125.

After reconciling the driver settings with the vehicle in the request, the data processing center 125 sends the driver settings to the $NAD_2$ 145 of the associated $Car_2$ 140 in step S406. In step S407, the ignition of $Car_2$ 140 is turned on. The driver settings are sent from $NAD_2$ 145 to $Car_2$ 140 in step S408. In step S409, the systems associated with the driver settings are initiated.

In step S402, the conditions and settings of $Car_1$ 110 were sent to the $NAD_1$ 115 when the ignition of $Car_1$ 110 was turned off. At a later time, the ignition of $Car_1$ 110 is turned on in step S410. The current conditions and settings of $Car_1$ 110 are sent to the $NAD_1$ 115 in step S411.

In step S412, the $NAD_1$ 115 predicts an event when any changes have occurred to $Car_1$ 110 since the ignition was previously turned off in step S401. For example, the $NAD_1$ 115 makes a comparison of various settings and/or conditions between the ignition turned off at step S401 and the ignition turned on at step S410. $NAD_1$ 115 can make certain conclusions from the comparison of the two states, such as the fuel level is higher, a car part was replaced, or a repair was performed on $Car_1$ 110. In step S413, the $NAD_1$ 115 sends any predicted events to the data processing center 125.

In step S414, the ignition of $Car_1$ 110 is turned off. Conditions and settings are automatically sent to the $NAD_1$ 115 in step S415.

In step S416, a request is sent from the mobile device 150 (and associated application) to the RAN 120. The request includes sending driver conditions and settings to $Car_1$ 110. In step S417, the RAN 120 forwards the driver request to the data processing center 125. In step S418, the data processing center 125 sends the conditions and settings to the $NAD_1$ 115. As a result, the updated conditions and settings are ready to be implemented upon startup of $Car_1$ 110.

In step S419, the ignition of $Car_1$ 110 is turned on. In step S420, the conditions and settings are sent from the $NAD_1$ 115 to $Car_1$ 110.

In step S421, the new or updated settings of $Car_1$ 110 are initiated. In addition, any conditions and/or alerts are displayed on a vehicle display of $Car_1$ 110 to inform a driver of any changes from previous conditions. For example, a displayed message could read that the fuel level changed from a low level to a full level. Another displayed message could read that a new maintenance item should be considered, such as "air filter should be replaced in the next 100 miles."

Embodiments described herein include uploading settings and conditions each time the ignition of a vehicle is turned on or off. In some circumstances, this could result in a large volume of data being uploaded in which there are no changes to either the settings or the conditions. For example, the same driver may use the same vehicle primarily for commuting to and from work. As a result, the settings are likely to be the same each time the vehicle is used. In addition, conditions may not change frequently. Therefore, one embodiment includes comparing new uploaded settings and conditions with existing settings and conditions. If the new data is the same as the existing data for settings and conditions, then the new data is not saved.

Figure 5:
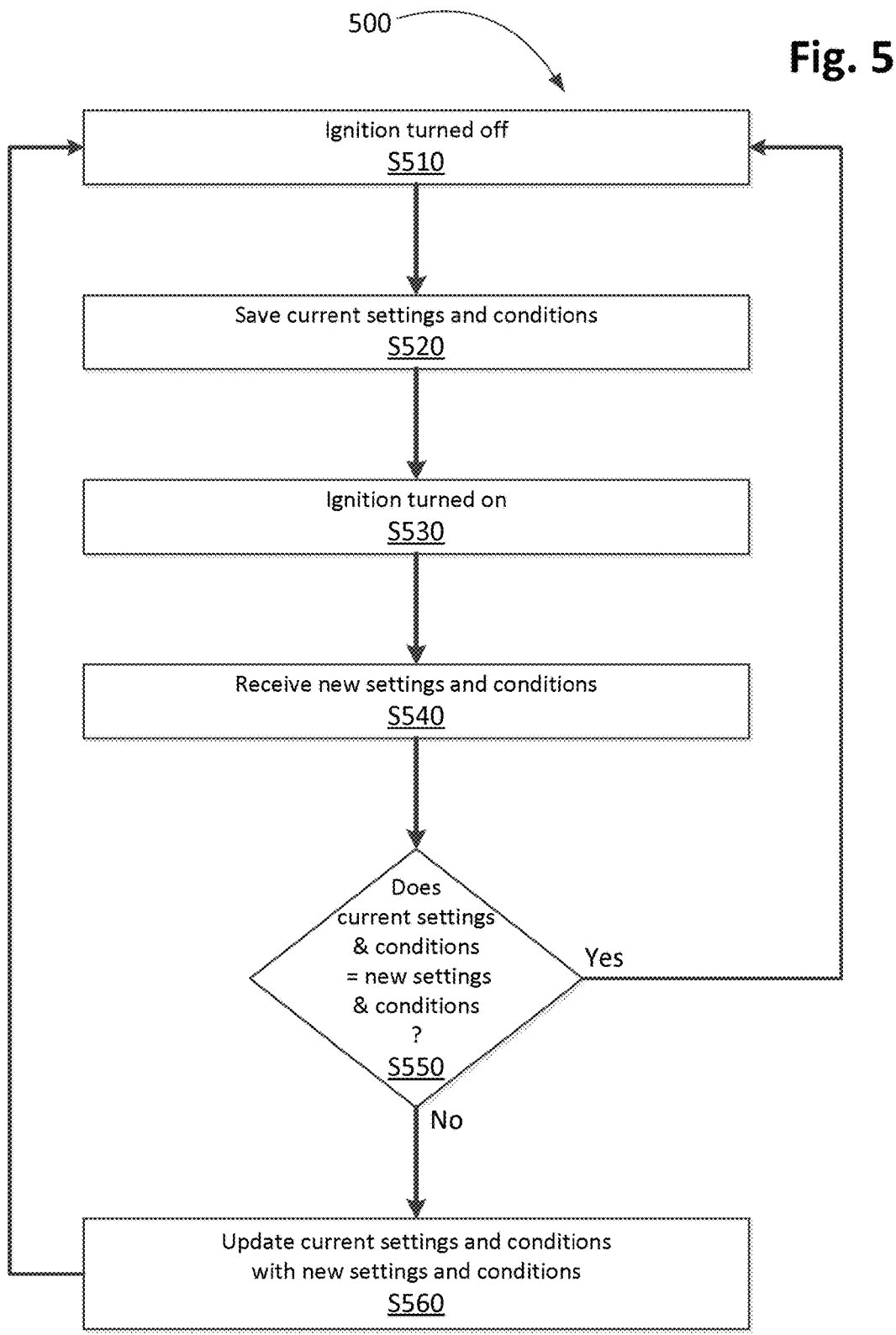
FIG. 5 is an exemplary algorithm for receiving, comparing, and updating data for settings and conditions of a vehicle according to one embodiment.

FIG. 5 is an exemplary algorithm 500 for receiving, comparing, and updating data for settings and conditions of a vehicle. In step S510, the ignition of a vehicle, such as $Car_1$ 110 or $Car_2$ 140 is turned off. The current settings and conditions are transmitted to the respective $NAD_1$ 115 and $NAD_2$ 145. In step S520, the current settings and conditions are forwarded and saved at the data processing center 125.

In step S530, the ignition is subsequently turned on. In step S540, new settings and conditions are received at $NAD_1$ 115 or $NAD_2$ 145. In step S550, a determination is made whether the new settings and conditions are the same as the current settings and conditions that were saved in step S520. If the current settings and conditions are the same as the new settings and conditions ("YES" decision in step S550), the new settings and conditions are not saved. The process subsequently returns to step S510.

If the current settings and conditions are different in any way from the new settings and conditions ("NO" decision in step S550), the process continues to step S560. In step S560, the settings and conditions are updated with the new settings and conditions obtained in step S540. The process subsequently returns to step S510.

The algorithm 500 provides an efficient process of keeping settings and conditions current without overloading the processing system with unnecessary duplicative data. If the $NAD_1$ 115 or $NAD_2$ 145 has determined that no change in data for the settings and conditions has occurred, the duplicative data is not forwarded to the data processing center 125. Only new data is forwarded to the data processing center 125.

A hardware description of an exemplary computing device 600 used in accordance with embodiments herein is described with reference to FIG. 6. Computing device 600 can be used as one or more of the devices illustrated in FIGS. 1-3.

Computing device 600 can be used as any one of the databases, such as the driver settings database 210, the vehicle database 230, the vehicle conditions database 250, and the driver database 270. Computing device 600 can also be used as any one of the driver settings search engine 215 and the vehicle conditions search engine 255. Computing device 600 can also be used as the database server 280 or the mobile device 150.

Computing device 600 is intended to represent various forms of digital hardware, such as laptops, desktops, workstations, personal digital assistants, servers, blade servers, mainframes, and other appropriate computers. The components shown here, their connections and relationships, and their functions are meant to be examples only and are not meant to be limiting.

The computing device 600 includes a processor 601, a memory 602, a storage device 604, a high-speed interface 612 connecting to the memory 602 and multiple high-speed expansion ports 616. A low-speed interface 610 is connected to a low-speed expansion port 614 and the storage device 604. Each of the processor 601, the memory 602, the storage device 604, the high-speed interface 612, the high-speed expansion ports 616, and the low-speed interface 610 are interconnected using various busses, such as communication bus 626, and may be mounted on a common motherboard or in other manners as appropriate.

The processor 601 can process instructions for execution within the computing device 600, including instructions stored in the memory 602 or on the storage device 604 to display graphical information for a GUI on an external input/output device, such as a display 608 coupled to the high-speed interface 612. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory 602 stores information within the computing device 600. In some implementations, the memory 602 is a volatile memory unit or units. In some implementations, the memory 602 is a non-volatile memory unit or units. The memory 602 can also be another form of computer-readable medium, such as a magnetic or optical disk.

The storage device 604 is capable of providing mass storage for the computing device 600. In some implementations, the storage device 604 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 601), perform one or more methods, such as those described above. The instructions can also be stored by one or more storage devices, such as computer- or machine-readable mediums (for example, the memory 602, the storage device 604, or memory on the processor 601).

The high-speed interface 612 manages bandwidth-intensive operations for the computing device 600, while the low-speed interface 610 manages lower bandwidth-intensive operations. Such allocation of functions is an example only. In some implementations, the high-speed interface 612 is coupled to the memory 602, the display 608 (e.g., through a graphics processor or accelerator), and to the high-speed expansion ports 616, which may accept various expansion cards (not shown). In the implementation, the low-speed interface 610 is coupled to the storage device 604 and the low-speed expansion port 614. The low-speed expansion port 614, which can include various communication ports (e.g., USB, Bluetooth, Ethernet, wireless Ethernet) can be coupled to one or more input/output devices 618, such as a keyboard, a pointing device, a scanner, or a networking device such as a switch or router, e.g., through a network adapter.

The computing device 600 also includes a network controller 606, such as an Intel Ethernet PRO network interface card from Intel Corporation of America, for interfacing with a network 99. As can be appreciated, the network 99 can be a public network, such as the Internet, or a private network such as an LAN or WAN network, or any combination thereof and can also include PSTN or ISDN sub-networks. The network 99 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Figure 6:
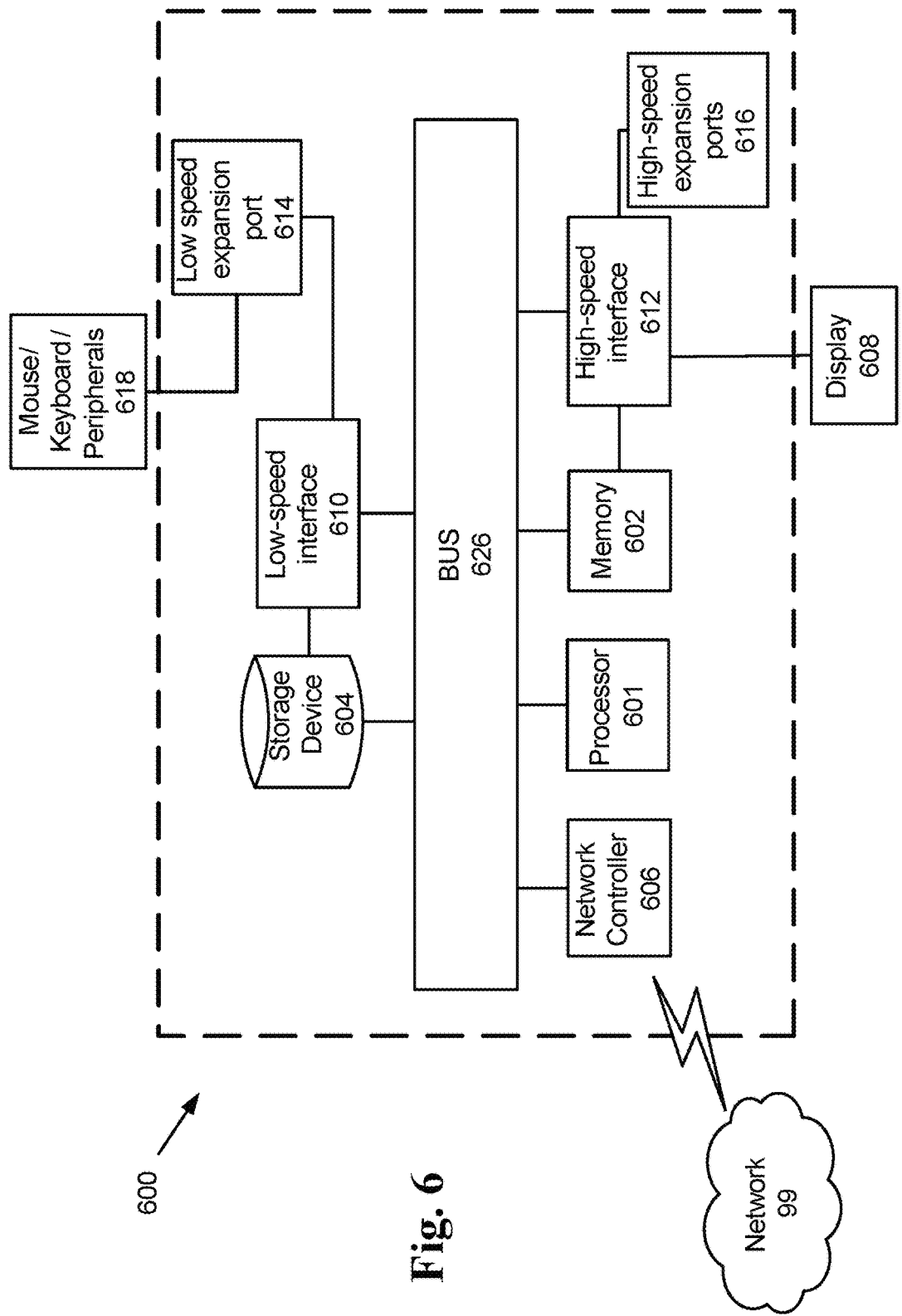
FIG. 6 is a block diagram of an exemplary computing system according to one embodiment.

Although the computing device 600 of FIG. 6 is described as having a storage medium device 604, the claimed advancements are not limited by the form of the computer-readable media on which the instructions of the described processes are stored. For example, the instructions can be stored on CDs, DVDs, in FLASH memory, RAM, ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly/machine language. As used herein, the terms machine-readable medium and computer-readable medium refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having the display device 608 (e.g., a CRT (cathode ray tube) or LCD (liquid crystal display) monitor) for displaying information to the user and a keyboard and a pointing device 618 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Figure 7:
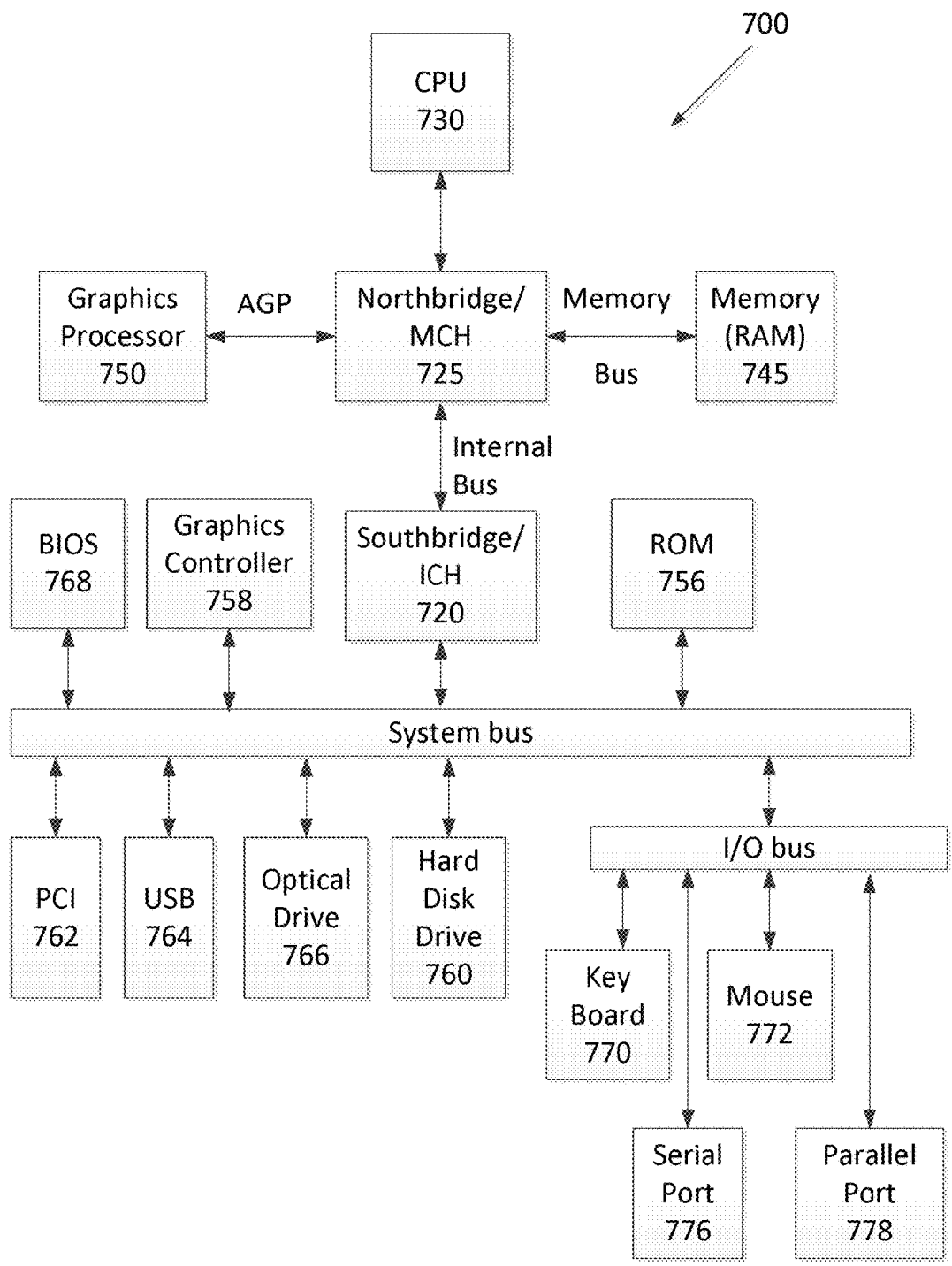
FIG. 7 is a schematic diagram of an exemplary data processing system according to one embodiment.

FIG. 7 shows a schematic diagram of an exemplary data processing system, according to aspects of the disclosure described herein for performing menu navigation, as described above. The data processing system is an example of a computer in which code or instructions implementing the processes of the illustrative embodiments can be located.

In FIG. 7, data processing system 700 employs an application architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU 730 can contain one or more processors and even can be implemented using one or more heterogeneous processor systems.

Figure 8:
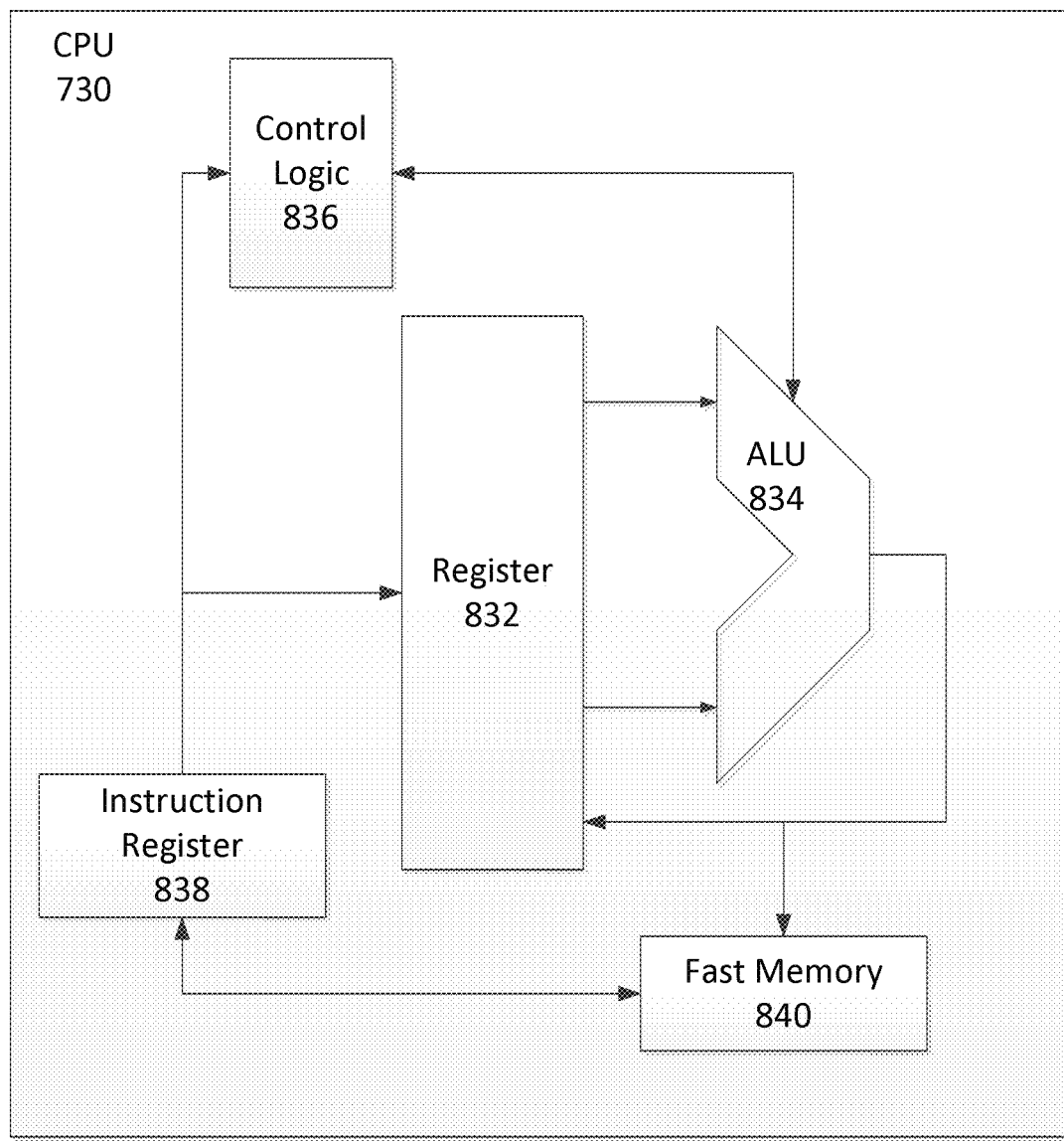
FIG. 8 is a block diagram of an exemplary CPU according to one embodiment.

For example, FIG. 8 illustrates one implementation of CPU 730. In one implementation, an instruction register 838 retrieves instructions from a fast memory 840. At least part of these instructions are fetched from an instruction register 838 by a control logic 836 and interpreted according to the instruction set architecture of the CPU 730. Part of the instructions can also be directed to a register 832. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using an arithmetic logic unit (ALU) 834 that loads values from the register 832 and performs logical and mathematical operations on the loaded values according to the instructions. The results from these operations can be fed back into the register 832 and/or stored in a fast memory 840. According to aspects of the disclosure, the instruction set architecture of the CPU 730 can use a reduced instruction set computer (RISC), a complex instruction set computer (CISC), a vector processor architecture, or a very long instruction word (VLIW) architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor; a Power architecture processor by, e.g., IBM; a SPARC architecture processor by Sun Microsystems or by Oracle; or other known CPU architectures.

Referring again to FIG. 7, the data processing system 700 can include the SB/ICH 720 being coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 720 through a PCI bus 762.

The PCI devices can include, for example, Ethernet adapters, add-in cards, and PC cards for notebook computers. The hard disk drive 760 and optical drive 766 can use, for example, an integrated drive electronics (IDE) or serial advanced technology attachment (SATA) interface. In one implementation the I/O bus can include a super I/O (SIO) device.

Further, the hard disk drive (HDD) 760 and optical drive 766 can also be coupled to the SB/ICH 720 through the system bus. In one implementation, a keyboard 770, a mouse 772, a parallel port 778, and a serial port 776 can be connected to the system bus through the I/O bus. Other peripherals and devices can be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein can also be executed by various distributed components of a system. For example, one or more processors can execute these system functions, wherein the processors are distributed across multiple components communicating in a network. The distributed components can include one or more client and server machines, which can share processing, such as a cloud computing system, in addition to various human interface and communication devices (e.g., display monitors, smart phones, tablets, personal digital assistants (PDAs)). The network can be a private network, such as a LAN or WAN, or can be a public network, such as the Internet. Input to the system can be received via direct user input and received remotely either in real-time or as a batch process. Additionally, some implementations can be performed on modules or hardware not identical to those described. Accordingly, other implementations are within the scope that can be claimed.

The functions and features described herein may also be executed by various distributed components of a system. For example, one or more processors may execute these system functions, wherein the processors are distributed across multiple components communicating in a network. For example, distributed performance of the processing functions can be realized using grid computing or cloud computing. Many modalities of remote and distributed computing can be referred to under the umbrella of cloud computing, including: software as a service, platform as a service, data as a service, and infrastructure as a service. Cloud computing generally refers to processing performed at centralized locations and accessible to multiple users who interact with the centralized processing locations through individual terminals.

Figure 9:
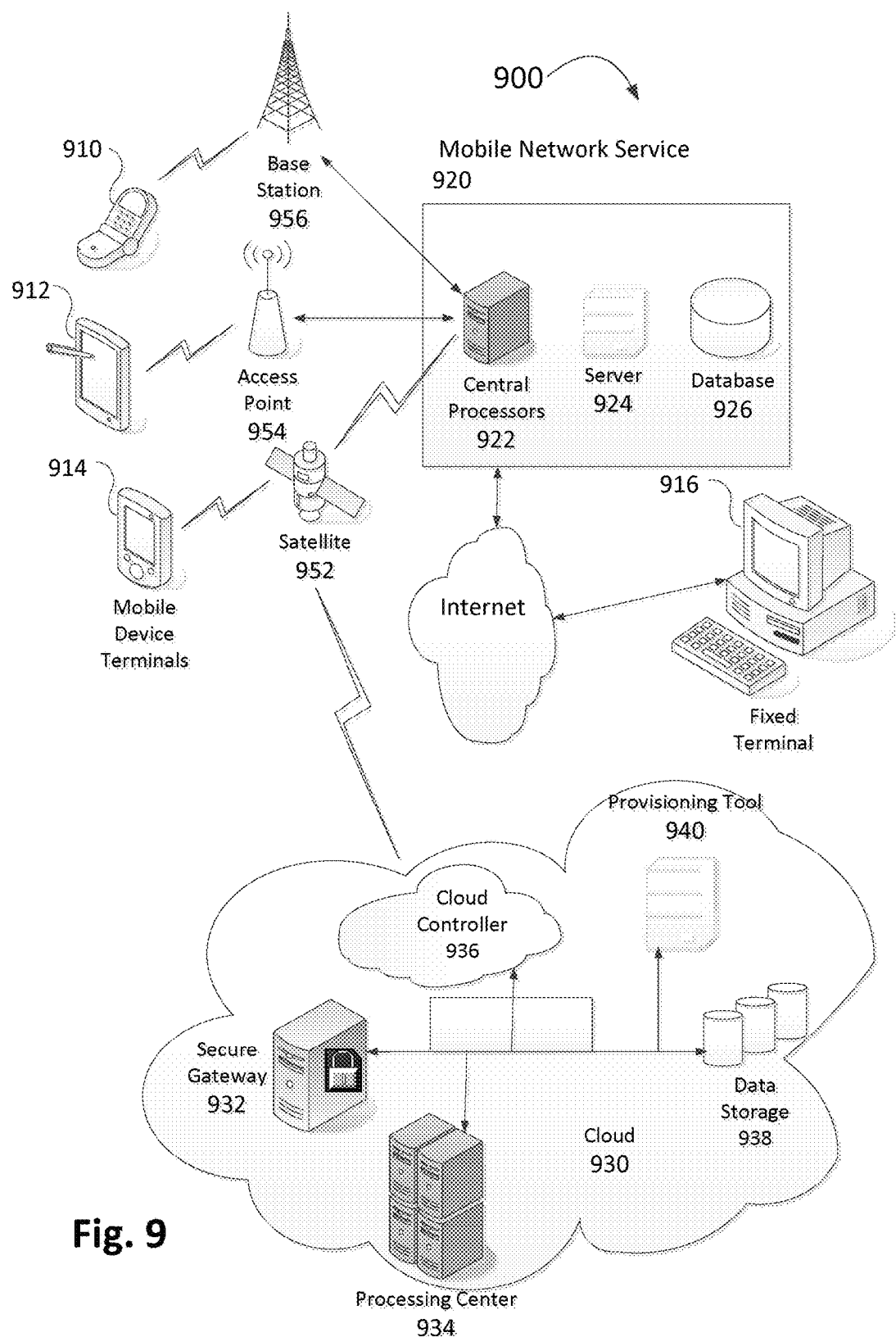
FIG. 9 illustrates an exemplary cloud computing system according to one embodiment.

FIG. 9 illustrates an exemplary cloud computing system 900, wherein users access the cloud through mobile device terminals or fixed terminals that are connected to the Internet or other network. One or more of the devices illustrated in the data processing center 125 of FIGS. 1-3 could be used in the cloud computing system 900 illustrated in FIG. 9.

Mobile device terminals can include a cell phone 910, a tablet computer 912, and a smartphone 914, for example. The mobile device terminals can connect to a mobile network service 920 through a wireless channel such as a base station 956 (e.g., an Edge, 3G, 4G, or LTE Network), an access point 954 (e.g., a femto cell or WiFi network), or a satellite connection 952. In one implementation, signals from the wireless interface to the mobile device terminals (e.g., the base station 956, the access point 954, and the satellite connection 952) are transmitted to a mobile network service 920, such as an EnodeB and radio network controller, UMTS, or HSDPA/HSUPA. Mobile users' requests and information are transmitted to central processors 922 that are connected to servers 924 to provide mobile network services, for example. Further, mobile network operators can provide service to mobile users for authentication, authorization, and accounting based on home agent and subscribers' data stored in databases 926, for example. The subscribers' requests are subsequently delivered to a cloud 930 through the Internet.

A user can also access the cloud 930 through a fixed terminal 916, such as a desktop or laptop computer or workstation that is connected to the Internet via a wired network connection or a wireless network connection. The mobile network service 920 can be a public or a private network such as an LAN or WAN network. The mobile network service 920 can be wireless such as a cellular network including EDGE, 3G and 4G wireless cellular systems. The wireless mobile network service 920 can also be Wi-Fi, Bluetooth, or any other wireless form of communication that is known.

The user's terminal, such as a mobile user terminal and a fixed user terminal, provides a mechanism to connect via the Internet to the cloud 930 and to receive output from the cloud 930, which is communicated and displayed at the user's terminal. In the cloud 930, a cloud controller 936 processes the request to provide users with the corresponding cloud services. These services are provided using the concepts of utility computing, virtualization, and service-oriented architecture.

In one implementation, the cloud 930 is accessed via a user interface such as a secure gateway 932. The secure gateway 932 can for example, provide security policy enforcement points placed between cloud service consumers and cloud service providers to interject enterprise security policies as the cloud-based resources are accessed. Further, the secure gateway 932 can consolidate multiple types of security policy enforcement, including for example, authentication, single sign-on, authorization, security token mapping, encryption, tokenization, logging, alerting, and API control.

The cloud 930 can provide to users, computational resources using a system of virtualization, wherein processing and memory requirements can be dynamically allocated and dispersed among a combination of processors and memories to create a virtual machine that is more efficient at utilizing available resources. Virtualization creates an appearance of using a single seamless computer, even though multiple computational resources and memories can be utilized according to increases or decreases in demand. In one implementation, virtualization is achieved using a provisioning tool 940 that prepares and equips the cloud resources, such as a processing center 934 and data storage 938 to provide services to the users of the cloud 930. The processing center 934 can be a computer cluster, a data center, a main frame computer, or a server farm. In one implementation, the processing center 934 and data storage 938 are collocated.

Embodiments described herein can be implemented in conjunction with one or more of the devices described above with reference to FIGS. 6-8 and/or in combination with the cloud computing system of FIG. 9. Embodiments are a combination of hardware and software, and processing circuitry by which the software is implemented.

FIG. 10 illustrates a flowchart for an exemplary vehicular data processing method 1000 according to an aspect of the present disclosure. Method 1000 includes programmable computer-executable instructions, that when used in combination with the above-described hardware devices, carry out the steps of method 1000. The hardware description above, exemplified by any one of the structural examples illustrated in FIGS. 6-9 constitutes or includes specialized corresponding structure that is programmed or configured to perform the algorithm illustrated in FIG. 10. For example, the algorithm illustrated in FIG. 10 can be completely performed by the single device illustrated in FIG. 6 or by the chipset illustrated in FIGS. 7-8.

FIG. 10 is a flowchart for an exemplary vehicular data processing method 1000. Method 1000 can be implemented using one or more of the computing systems described herein.

In step S1010, a first driver settings dataset in a driver settings database is cross-referenced to a first vehicle dataset in a vehicle database to form a first enhanced data packet. The cross-referencing occurs via processing circuitry of a database server, such as database server 280. The first driver settings dataset can include one or more of infotainment settings, a memory seat setting, a saved destination setting, and a memory mirror setting.

In step S1020, a first vehicle conditions dataset in a vehicle conditions database is cross-referenced to a first driver dataset in a driver database to form a second enhanced data packet. The cross-referencing occurs via processing circuitry of the database server. The first vehicle conditions dataset can include one or more of a fuel level status, a check engine light notification, a maintenance reminder, a driving schedule, a scheduled servicing calendar, a scheduled detailing calendar, and driver-inputted vehicle performance notes.

In step S1030, the first enhanced data packet is correlated with the second enhanced data packet. The correlating occurs via processing circuitry of the database server.

In step S1040, the first enhanced data packet is downloaded to a first NAD of a first vehicle. The first driver settings dataset can also be downloaded to a second vehicle or any other vehicle in which the driver is registered.

In step S1050, the second enhanced data packet is downloaded to the first NAD. The second enhanced data packet can be downloaded to the first NAD, via instructions received from a mobile device.

In step S1060, a first initiation signal is transmitted to implement the first driver settings dataset and to display the first vehicle conditions dataset on the first vehicle, via the first NAD. The first initiation signal can be transmitted in response to receiving a first ignition start signal from the first NAD. The first vehicle conditions dataset can be displayed on a display of the first vehicle.

Several technical advantages are provided by embodiments described herein. A first advantage is provided by uploading the settings, as well as the conditions of a vehicle upon turning the vehicle ignition on or off. A second advantage is provided by the correlation of the vehicle database 230 and the driver database 270, via enhanced data packets. The conditions and settings of any particular vehicle are correlated with all drivers registered to operate that vehicle. Therefore, any registered driver has the latest data of settings and conditions for that vehicle upon turning on the ignition. In addition, each driver is correlated with all vehicles in which a particular driver is registered. Therefore, all settings for a particular driver are automatically downloaded to any registered vehicle the particular driver has selected upon turning on the ignition.

Enhanced data packets condense data, such as a first vehicle conditions table cross-referenced to all registered drivers of the first vehicle in the driver database 270. By condensing the cross-referenced data into a single data structure, vast amounts of data are condensed, which reduces computer network congestion. Likewise, an enhanced data packet can condense the data for the second vehicle conditions table cross-referenced to all registered drivers of the second vehicle in the driver database 270.

An enhanced data packet can also be utilized to condense data for the first driver settings table cross-referenced to all vehicles the first driver is registered to drive in the vehicle database 230. Likewise, an enhanced data packet can condense the data for the second driver settings table cross-referenced to all vehicles the second driver is registered to drive in the vehicle database 230.

The vehicle database 230 includes vehicle data cross-referenced with associated driver settings data from the driver settings database 210 to form associated "vehicle data/driver settings" enhanced data packets. The driver database 270 includes driver data cross-referenced with associated vehicle conditions data from the vehicle conditions database 250 to form associated "driver data/vehicle conditions" enhanced data packets. Likewise, data for each vehicle in the vehicle database 230 is cross-referenced with data for all drivers registered to drive each respective vehicle in the driver database 270. Therefore, "vehicle data/driver settings" enhanced data packets from the vehicle database 230 are correlated with "driver data/vehicle conditions" enhanced data packets from the driver database 270.

The improved efficiency of the driver settings database 210, the driver settings search engine 215, the first mapping engine 220, the vehicle database 230, the vehicle conditions database 250, the vehicle conditions search engine 255, the second mapping engine 260, and the driver database 270 and associated processing circuitry of the data processing center 125 provide instant vehicle settings and instant delivery of vehicle conditions upon starting the vehicle ignition. Updated settings and conditions are automatically uploaded to the data processing center 125 upon turning the vehicle ignition off.

Embodiments described herein include the following aspects.

(1) A vehicular data correlation system includes a first network access device (NAD) of a first vehicle; and a database server having processing circuitry. The processing circuitry is configured to cross-reference a first driver settings dataset in a driver settings database to a first vehicle dataset in a vehicle database to form a first enhanced data packet, cross-reference a first vehicle conditions dataset in a vehicle conditions database to a first driver dataset in a driver database to form a second enhanced data packet, correlate the first enhanced data packet with the second enhanced data packet, download the first enhanced data packet to the first NAD, download the second enhanced data packet to the first NAD, and transmit a first initiation signal to implement the first driver settings dataset and to display the first vehicle conditions dataset on the first vehicle, via the first NAD.

(2) The vehicular data correlation system of (1), wherein the processing circuitry is further configured to transmit the first initiation signal in response to receiving a first ignition start signal from the first NAD.

(3) The vehicular data correlation system of either (1) or (2), wherein the processing circuitry is further configured to download the first driver settings dataset to a second NAD of a second vehicle.

(4) The vehicular data correlation system of any one of (1) through (3), wherein the processing circuitry is further configured to cross-reference a second vehicle conditions dataset in the vehicle conditions database to the first driver dataset in the driver database, download the second vehicle conditions dataset cross-referenced to the first driver dataset to the second NAD, and transmit a second initiation signal to implement the first driver settings dataset and to display the second vehicle conditions dataset on the second vehicle, via the second NAD.

(5) The vehicular data correlation system of any one of (1) through (4), wherein the processing circuitry is further configured to upload a current driver settings dataset and upload a current vehicle conditions dataset of the first vehicle in response to receiving an ignition off signal from the first NAD.

(6) The vehicular data correlation system of any one of (1) through (5), wherein the processing circuitry is further configured to upload a subsequent driver settings dataset and upload a subsequent vehicle conditions dataset of the first vehicle in response to receiving a second ignition start signal from the first NAD, determine a change in one or more conditions between the uploaded current vehicle conditions dataset and the uploaded subsequent vehicle conditions dataset, and predict an event from the determined change in one or more conditions.

(7) The vehicular data correlation system of any one of (1) through (6), wherein the processing circuitry is further configured to download the first driver settings dataset to one of the first NAD or a second NAD of a second vehicle, via instructions received from a mobile device.

(8) The vehicular data correlation system of any one of (1) through (7), wherein the processing circuitry is further configured to download the first driver settings dataset and download the first vehicle conditions dataset to the first NAD, via instructions received from a mobile device.

(9) The vehicular data correlation system of any one of (1) through (8), wherein the first driver settings dataset includes one or more of infotainment settings, a memory seat setting, a saved destination setting, and a memory mirror setting.

(10) The vehicular data correlation system of any one of (1) through (9), wherein the first vehicle conditions dataset includes one or more of a fuel level status, a check engine light notification, a maintenance reminder, a driving schedule, a scheduled servicing calendar, a scheduled detailing calendar, and driver-inputted vehicle performance notes.

(11) A method of correlating vehicular data includes cross-referencing, via processing circuitry of a database server, a first driver settings dataset in a driver settings database to a first vehicle dataset in a vehicle database to form a first enhanced data packet; cross-referencing, via processing circuitry of the database server, a first vehicle conditions dataset in a vehicle conditions database to a first driver dataset in a driver database to form a second enhanced data packet; correlating, via processing circuitry of the database server, the first enhanced data packet with the second enhanced data packet; downloading the first enhanced data packet to a first network access device (NAD) of a first vehicle; downloading the second enhanced data packet to the first NAD; and transmitting a first initiation signal to implement the first driver settings dataset and to display the first vehicle conditions dataset on the first vehicle, via the first NAD.

(12) The method of correlating vehicular data of (11), wherein transmitting the first initiation signal is in response to receiving an ignition start signal from the first NAD.

(13) The method of correlating vehicular data of either (11) or (12), further includes downloading the first driver settings dataset to a second NAD of a second vehicle.

(14) The method of correlating vehicular data of any one of (11) through (13), further includes cross-referencing, via processing circuitry of the database server, a second vehicle conditions dataset in the vehicle conditions database to the first driver dataset in the driver database; downloading the second vehicle conditions dataset cross-referenced to the first driver dataset to the second NAD; and transmitting a second initiation signal to implement the first driver settings dataset and to display the second vehicle conditions dataset on the second vehicle, via the second NAD.

(15) The method of correlating vehicular data of any one of (11) through (14), further includes uploading a current driver settings dataset and uploading a current vehicle conditions dataset of the first vehicle in response to receiving an ignition off signal from the first NAD.

(16) The method of correlating vehicular data of any one of (11) through (15), further includes uploading a subsequent driver settings dataset and uploading a subsequent vehicle conditions dataset of the first vehicle in response to receiving a second ignition start signal from the first NAD; determining a change in one or more conditions between the uploaded current vehicle conditions dataset and the uploaded subsequent vehicle conditions dataset; and predicting an event from the determined change in one or more conditions, via the first NAD.

(17) A vehicular data correlation system includes a database server having processing circuitry configured to cross-reference a first driver settings dataset in a driver settings database to a first vehicle dataset in a vehicle database to form a first enhanced data packet, cross-reference a first vehicle conditions dataset in a vehicle conditions database to a first driver dataset in a driver database to form a second enhanced data packet, correlate the first enhanced data packet with the second enhanced data packet, download the first enhanced data packet to a first network access device (NAD) of a first vehicle, download the second enhanced data packet to the first NAD, and transmit a first initiation signal to implement the first driver settings dataset and to display the first vehicle conditions dataset on the first vehicle, via the first NAD.

(18) The vehicular data correlation system of (17), wherein the processing circuitry is further configured to download the first driver settings dataset to a second NAD of a second vehicle.

(19) The vehicular data correlation system of either (17) or (18), wherein the processing circuitry is further configured to upload a current driver settings dataset and upload a current vehicle conditions dataset of the first vehicle in response to receiving an ignition off signal from the first NAD.

(20) The vehicular data correlation system of any one of (17) through (19), wherein the processing circuitry is further configured to upload a subsequent driver settings dataset and upload a subsequent vehicle conditions dataset of the first vehicle in response to receiving a second ignition start signal from the first NAD, determine a change in one or more conditions between the uploaded current vehicle conditions dataset and the uploaded subsequent vehicle conditions dataset, and predict an event from the determined change in one or more conditions.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A vehicular data correlation system, comprising:
a plurality of vehicles, each vehicle including a network access device (NAD); and
a database server having processing circuitry configured to
store driver information for a plurality of drivers in a driver database,
store vehicle information for a plurality of vehicles in a vehicle database,
for each driver referenced in the driver database, correlate driver information with vehicle information of at least one vehicle stored in the vehicle database,
cross-reference a first driver settings dataset in a driver settings database to a first vehicle dataset in the vehicle database to form a first enhanced data packet, wherein a driver is associated with the first driver settings dataset, the first driver settings dataset is cross-referenced to the at least one vehicle correlated with the driver in the vehicle database, and the first driver settings dataset includes one or more of infotainment settings, a memory seat setting, a saved destination setting, and a memory mirror setting,
cross-reference a first vehicle conditions dataset in a vehicle conditions database to a first driver dataset in the driver database to form a second enhanced data packet, wherein the driver is associated with the first vehicle conditions dataset, correlate the first enhanced data packet with the second enhanced data packet, download the first enhanced data packet to the NAD of each vehicle correlated with the driver in the vehicle database, download the second enhanced data packet to the NAD of each vehicle correlated with the driver in the vehicle database, transmit a first initiation signal to a first NAD of a first vehicle correlated with the driver in the vehicle database in response to receiving a first ignition start signal from the first NAD, upload from the first NAD a current driver settings dataset and a current vehicle conditions dataset of the first vehicle in response to receiving an ignition off signal from the first NAD, upload from the first NAD a subsequent driver settings dataset and a subsequent vehicle conditions dataset of the first vehicle in response to receiving a second ignition start signal from the first NAD, determine a change in one or more conditions between the uploaded current vehicle conditions dataset and the uploaded subsequent vehicle conditions dataset, and predict an event from the determined change in one or more conditions; wherein the first NAD is configured to implement the first driver settings dataset and to display the first vehicle conditions dataset on the first vehicle.

2. The vehicular data correlation system of claim 1, wherein the processing circuitry is further configured to download the first driver settings dataset to a second NAD of a second vehicle correlated with the driver in the vehicle database.

3. The vehicular data correlation system of claim 2, wherein the processing circuitry is further configured to:
transmit a second initiation signal to the second NAD to implement the first driver settings dataset and to display the second vehicle conditions dataset on the second vehicle.

4. The vehicular data correlation system of claim 1, wherein the processing circuitry is further configured to download the first driver settings dataset to a NAD of said each vehicle correlated with the driver in the vehicle database via instructions received from a mobile device.

5. The vehicular data correlation system of claim 1, wherein the processing circuitry is further configured to download the first driver settings dataset and download the first vehicle conditions dataset to the first NAD, via instructions received from a mobile device.

6. The vehicular data correlation system of claim 1, wherein the first vehicle conditions dataset includes one or more of a fuel level status, a check engine light notification, a maintenance reminder, a driving schedule, a scheduled servicing calendar, a scheduled detailing calendar, and driver-inputted vehicle performance notes.

7. A method of correlating vehicular data for a plurality of vehicles, each vehicle including a network access device (NAD), the method comprising:
storing driver information for a plurality of drivers in a driver database;
storing vehicle information for the plurality of vehicles in a vehicle database;
for each driver referenced in the driver database, correlating driver information with vehicle information of at least one vehicle stored in the vehicle database;
cross-referencing, via processing circuitry of a database server, a first driver settings dataset in a driver settings database to a first vehicle dataset in a vehicle database to form a first enhanced data packet, wherein a driver is associated with the first driver settings dataset, the first driver settings dataset is cross-referenced to the at least one vehicle correlated with the driver in the vehicle database, and the first driver settings dataset includes one or more of infotainment settings, a memory seat setting, a saved destination setting, and a memory mirror setting;
cross-referencing, via processing circuitry of the database server, a first vehicle conditions dataset in a vehicle conditions database to a first driver dataset in a driver database to form a second enhanced data packet, wherein the driver is associated with the first vehicle conditions dataset;
correlating, via processing circuitry of the database server, the first enhanced data packet with the second enhanced data packet;
downloading the first enhanced data packet to a NAD of a first vehicle correlated with the driver in the vehicle database;
downloading the second enhanced data packet to the first NAD;
transmitting a first initiation signal to the first NAD to implement the first driver settings dataset and to display the first vehicle conditions dataset on the first vehicle,
uploading from the first NAD a current driver settings dataset and a current vehicle conditions dataset of the first vehicle in response to receiving an ignition off signal from the first NAD;
uploading from the first NAD a subsequent driver settings dataset and a subsequent vehicle conditions dataset of the first vehicle in response to receiving a second ignition start signal from the first NAD;
determining a change in one or more conditions between the uploaded current vehicle conditions dataset and the uploaded subsequent vehicle conditions dataset and
predicting an event from the determined change in one or more conditions.

8. The method of claim 7, further comprising:
downloading the first driver settings dataset to a second NAD of a second vehicle correlated with the driver in the vehicle database.

9. The method of claim 8, further comprising:
cross-referencing, via processing circuitry of the database server, a second vehicle conditions dataset in the vehicle conditions database to the first driver dataset in the driver database;
downloading the second vehicle conditions dataset cross-referenced to the first driver dataset to the second NAD; and
transmitting a second initiation signal to the second NAD to implement the first driver settings dataset and to display the second vehicle conditions dataset on the second vehicle.

10. A database server of a vehicular data correlation system for a plurality of vehicles, each vehicle including a network access device (NAD), the database server comprising:
processing circuitry configured to
store driver information for a plurality of drivers in a driver database;

store vehicle information for the plurality of vehicles in a vehicle database;

for each driver referenced in the driver database, correlate driver information with vehicle information of at least one vehicle stored in the vehicle database;

cross-reference a first driver settings dataset in a driver settings database to a first vehicle dataset in a vehicle database to form a first enhanced data packet, wherein a driver is associated with the first driver settings dataset, the first driver settings dataset is cross-referenced to the at least one vehicle correlated with the driver in the vehicle database, and the first driver settings dataset includes one or more of infotainment settings, a memory seat setting, a saved destination setting, and a memory mirror setting, cross-reference a first vehicle conditions dataset in a vehicle conditions database to a first driver dataset in a driver database to form a second enhanced data packet, wherein the driver is associated with the first vehicle conditions dataset, correlate the first enhanced data packet with the second enhanced data packet, download the first enhanced data packet to a NAD of a first vehicle correlated with the driver in the vehicle database, download the second enhanced data packet to the first NAD, transmit a first initiation signal to the first NAD to implement the first driver settings dataset and to display the first vehicle conditions dataset on the first vehicle upload from the first NAD a current driver settings dataset and a current vehicle conditions dataset of the first vehicle in response to receiving an ignition off signal from the first NAD, upload from the first NAD a subsequent driver settings dataset and a subsequent vehicle conditions dataset of the first vehicle in response to receiving a second ignition start signal from the first NAD, determine a change in one or more conditions between the uploaded current vehicle conditions dataset and the uploaded subsequent vehicle conditions dataset, and predict an event from the determined change in one or more conditions.

11. The vehicular data correlation system of claim 10, wherein the processing circuitry is further configured to download the first driver settings dataset to a second NAD of a second vehicle.

* * * * *